(12) United States Patent
Shishido et al.

(10) Patent No.: US 7,046,208 B2
(45) Date of Patent: May 16, 2006

(54) ANTENNA APPARATUS

(75) Inventors: Jun Shishido, Osaka (JP); Toshiya Kitagawa, Kyoto (JP)

(73) Assignee: Omron Corporation, Kyoto (JP)

( * ) Notice: Subject to any disclaimer, the term of this patent is extended or adjusted under 35 U.S.C. 154(b) by 23 days.

(21) Appl. No.: 10/817,831

(22) Filed: Apr. 6, 2004

(65) Prior Publication Data

US 2004/0196205 A1   Oct. 7, 2004

(30) Foreign Application Priority Data

Apr. 7, 2003 (JP) ............... P.2003-102503
Mar. 31, 2004 (JP) ............... P.2004-102114

(51) Int. Cl.
*H01Q 7/04* (2006.01)

(52) U.S. Cl. .................. 343/742; 343/867
(58) Field of Classification Search ......... 343/742, 343/867; 340/572.7
See application file for complete search history.

(56) References Cited

U.S. PATENT DOCUMENTS

| 4,260,990 | A | | 4/1981 | Lichtblau |
| 4,866,455 | A | | 9/1989 | Lichtblau |
| 6,137,447 | A | * | 10/2000 | Saitoh et al. ............... 343/742 |
| 6,166,706 | A | | 12/2000 | Gallagher, III et al. |

FOREIGN PATENT DOCUMENTS

| EP | 0 440 370 A1 | 8/1991 |
| EP | 0 663 657 A1 | 7/1995 |
| EP | 1 233 367 A2 | 8/2002 |
| EP | 1 298 761 A2 | 4/2003 |
| JP | 2002-237720 | 8/2002 |

* cited by examiner

*Primary Examiner*—Michael C. Wimer
(74) *Attorney, Agent, or Firm*—Dickstein Shapiro Morin & Oshinsky LLP

(57) ABSTRACT

A loop shape of a receiving antenna corresponding to at least one magnetic flux passing region of the receiving antenna is modified to provide such that totals of an amount of magnetic fluxes in a positive phase and an amount of magnetic fluxes in an inverse phase produced at respective magnetic flux passing regions of the receiving antenna in correspondence with the respective loops of three or more loops of a transmitting antenna are canceled by each other.

3 Claims, 11 Drawing Sheets

ANTENNA APPARATUS

BACKGROUND OF THE INVENTION

1. Field of the Invention

The present invention relates to an antenna apparatus for carrying out data communication in noncontact between the antenna apparatus and a data carrier used by being attached to a person or goods, for example, for control of entrance and evacuation or automatic sorting of goods. More particularly, the present invention relates to an antenna apparatus increasing a receiving capacity in noncontact communication.

2. Description of the Related Art

Normally, a noncontact RF tag (hereinafter, referred to as RF tag) used as a data carrier comprises a coil antenna and an IC chip including an involatile memory. Data communication is carried out by wireless between the RF tag and an antenna apparatus which generates an induced magnetic field. The technology of noncontact communication attracts attention as a recognition technology substituting for a bar code. In the RF tag enabling the noncontact communication, a power source for operating the IC chip is taken out from the induced magnetic field generated by the antenna and therefore, a battery is dispensed with.

Meanwhile, a loop antenna is used for the antenna apparatus and various antenna shapes are constituted depending on methods and location of use thereof.

For example, there is present an antenna apparatus arranged with one antenna provided to be opposite to one side of a detecting region, or a gate type antenna apparatus arranged with two antennas having the same shape provided on both sides of a detecting region so that they are opposite to each other. The antenna apparatus are used for an automatic reading apparatus of goods carried by a conveyer, a reading apparatus for inventory control for entrance and evacuation of goods, or a related-art security gate of preventing shoplifting.

An antenna apparatus used for such an object is requested to read the RF tag within the detecting region without being dependent on a position or a direction thereof and needs to realize the reading within a limited radio wave output in compliance with the radio law. In order to satisfy the conflicting requests, a number of modes of antennas have been proposed in the related-art antenna apparatus using radio wave.

When an investigation is given on a communicating function of an antenna of this kind, in the case that transmission and reception can be carried out by one antenna, normally, the antenna is set to adapt to a transmitting frequency and therefore, a receiving sensitivity is lower than that in an optimum case. Therefore, there is a case of providing a receiving antenna set to adapt to a receiving frequency separately from a transmitting antenna or a transmitting and receiving antenna.

For example, as shown in FIG. 6, when 1 loop of a receiving antenna 62 formed in a rectangular shape is arranged on an inner side of 1 loop of a transmitting antenna 61 similarly formed in a rectangular tape, a current 63 is induced to couple at the receiving antenna 62 by a magnetic field generated in a direction of penetrating a loop shape of the transmitting antenna 61. Therefore, a current flowing in the transmitting antenna 61 is reduced by an amount of being consumed by being coupled to the receiving antenna 62.

As a countermeasure against the reduction in the current, as shown by FIG. 7, a transmitting antenna 71 having a first loop antenna 71a and a second loop antenna 71b in a 8-like shape is provided. When a current having a phase inverse to a phase of a current flowing in the second loop antenna 71b is made to flow in the first loop antenna 71a, a current 73a induced in a receiving antenna 72 by a magnetic field generated by the first loop antenna 71a and a current 73b induced in the receiving antenna 72 by a magnetic field generated by the second loop antenna 71b are provided with the same magnitude and inverse directions of currents. Therefore, the current 73a and the current 73b are canceled by each other. Thereby, coupling of the transmitting antenna 71 and the receiving antenna 72 is eliminated to thereby prevent the reduction in the current of the transmitting antenna 71.

The above-described shape of 2 loops is not limited thereto but as shown by FIG. 8, there can also be provided a transmitting antenna 81 of a 8-like shape which is formed in a rectangular shape, an upper side of which is provided for a first loop antenna 81a and a lower side of which is provided for a second loop antenna 81b. The first and second loop antennas 81a, 81b are formed by narrowing a central portion of the transmitting antenna 81 to an interval by which the 2 loops are not intersected with each other.

Further, when considering a case of 3 loops of a transmitting antenna, as shown by FIG. 9, a transmitting antenna 91 has a first through a third loop antenna 91a through 91c arranged in series in a rectangular shape. In the first loop antenna 91a and the third loop antenna 91c at both end portions of the transmitting antenna 91, currents having a phase inverse to a phase of a current flowing in the second loop antenna 91b is made to flow.

In this case, when a receiving antenna 92 in the rectangular shape is arranged on a plane the same as that of a transmitting antenna 91 and on an inner side of the transmitting antenna 91, respective magnetic fluxes generated by the transmitting antenna 91 are made to pass a first through a third magnetic flux passing region $S_1$, $S_2$, $S_3$ on the inner side of the receiving antenna 92 in correspondence with the first through the third loop antennas 91a through 91c. At this occasion, a direction of magnetic fluxes in the first and the third magnetic flux passing regions $S_1$, $S_3$ is inverse to a direction of magnetic fluxes of the second magnetic flux passing region $S_2$.

When the magnetic fluxes of the respective magnetic flux regions $S_1$, $S_2$, $S_3$ are respectively designated by notations $\phi_1$, $\phi_2$, $\phi_3$, a total $\phi$ of the fluxes passing the first through the third magnetic flux passing regions $S_1$, $S_2$, $S_3$ of the receiving antenna 92 becomes $\phi_1 - \phi_2 + \phi_3$.

Normally, a relationship of a degree of canceling when the magnetic fluxes passing the magnetic flux passing regions of the receiving antenna 92 are canceled by each other is not $\phi_1 + \phi_3 = \phi_2$. Therefore, the total $\phi$ of the magnetic fluxes is not nullified. Therefore, a current is induced in the receiving antenna 92, a current flowing in the transmitting antenna 91 is consumed to reduce by the receiving antenna 92 and thus a transmitting function is reduced. When such an inappropriate coupling cannot completely be canceled, a communicating function is reduced and a region of detecting the RF tag is narrowed.

Further, JP-A-2002-237720 discloses a technology of achieving excellent communication by using 4 loops of a transmitting antenna and minimizing a nondetecting region produced at a portion of intersecting loop antennas. However, when a receiving antenna can be a related-art rectangular shape is provided to increase a receiving function of the antenna apparatus, there is a case in which a transmitting function is reduced owing to the above-described fact that the total of the magnetic fluxes is not nullified.

SUMMARY OF THE INVENTION

It is an object of the present invention to provide an antenna apparatus providing an antenna structure capable of completely canceling a reduction in an inappropriate current by coupling currents between a transmitting antenna and a receiving antenna when 3 loops or more of a transmitting antenna is used to thereby enable to ensure a highly reliable and stable transmitting function.

In order to achieve the above-mentioned object of the present invention, there is provided an antenna apparatus comprising:

at least one antenna assembly having a transmitting antenna and a receiving antenna arranged to be along the transmitting antenna on the same plane, the transmitting antenna having three or more loops arranged in a loop shape contiguously to each other on a plane so that at least one loop is formed in a manner that a phase of a current flowing in the loop is made to be inverse to a phase of a current flowing in other loop contiguous to the loop, the receiving antenna having one loop, wherein a data communication is carried out in noncontact between the antenna assembly and a data carrier, wherein a portion of a loop shape of the loop of the receiving antenna corresponding to at least one magnetic flux region of the receiving antenna is modified to provide such that totals of an amount of magnetic fluxes in a positive phase and an amount of magnetic fluxes in an inverse phase produced at respective magnetic flux passing regions of the receiving antenna in correspondence with the respective loops of the transmitting antenna are cancelled by each other.

In the case of constituting the three or more loops of the transmitting antenna, when a receiving antenna having a simple loop shape of a rectangular shape is provided along the transmitting antenna, a transmitting current may be consumed by a side of the receiving antenna provided along with the transmitting antenna, and there is a concern of reducing a transmitting function. Therefore, it is necessary to arrange the receiving antenna such that the transmitting function is not reduced. Hence, when a loop shape of a loop portion of the receiving antenna in correspondence with the magnetic flux passing region of the receiving antenna is changed, the receiving antenna can be arranged such that the amounts of magnetic fluxes in positive and inverse phases opposed to each other passing the magnetic flux passing region can completely be canceled by each other.

According to the invention, in the case of constituting three or more loops of the transmitting antenna, there are present three or more pieces of the magnetic flux passing regions in accordance with the number of loops of the transmitting antenna on the side of the receiving antenna arranged along the transmitting antenna. Therefore, by partially changing the loop shape of the receiving antenna in correspondence with the magnetic flux passing regions, the sizes of the respective magnetic flux passing regions can be changed. Therefore, the magnitudes of the amounts of magnetic fluxes can partially be controlled such that the amount of magnetic fluxes in the positive phase and the amount of magnetic fluxes in the inverse phase passing the respective magnetic flux passing regions of the receiving antenna can completely be canceled by each other.

As a result, even when the receiving antenna is arranged along the transmitting antenna, a current outputted to the transmitting antenna is not consumed by the side of the receiving antenna and the transmitting current can be used effectively as a transmitting output as it is. Therefore, the transmitting function is not reduced and the highly reliable and stable transmitting function can be maintained.

The data carrier is provided with inherent data capable of carrying out data communication in noncontact via an induced magnetic field and can be constituted by a noncontact IR tag of an IC tag (RF-ID tag, RF tag), an ID tag or the like. A shape of the data carrier can be formed in a card type, a stick type, a coin type or the like.

The loop shape is preferably constituted by a shape capable of providing a wide magnetic flux passing region in the loop, and preferably a shape suitable for arranging the loop on the plane. Therefore, a rectangular shape, a square shape or the like, or an elliptic shape proximate to a rectangular shape is suitable therefor.

Further, when three or more loops of the transmitting antenna is constituted, a plurality of loops having the same size may be arranged, the plurality of loops having different sizes may be arranged and the transmitting antenna can be provided by arranging the loops in an arbitrary sizes.

For example, in the case of three loops, there is constructed a constitution of arrangement in which a large loop for producing magnetic fluxes in a positive phase is provided at a central portion of the transmitting antenna, small loops having a half size for producing magnetic fluxes in an inverse phase are respectively provided on both sides of the transmitting antenna, three sections of the magnetic flux passing regions in correspondence with the three loops of the transmitting antenna are provided on a side of the receiving antenna, and the magnetic fluxes having phases different from each other are canceled by each other by the central loop and the loops on the both sides.

Further, when the loops are arranged on the plane, the antenna assembly in the flat plate shape is constituted and a wide detecting region is provided, which is suitable for being arranged to a space which is thin and limited.

In utilizing the antenna apparatus, there may be constructed a constitution of arrangement in which one antenna assembly is provided to be opposite to one face of the detecting region, and the antenna apparatus is applicable also to a gate type in which the antenna assemblies having the same shape are provided to be opposed to each other on both sides interposing a detecting region.

The above-mentioned structure may be applied to not only the transmitting antenna but also a transmitting and receiving antenna having a transmitting function and a receiving function.

In the above-mentioned antenna apparatus of the present invention, a loop shape of the transmitting antenna may be provided in a rectangular shape, a loop shape of the receiving antenna may be provided in a rectangular shape in correspondence with the loop shape of the transmitting antenna, and the portion of the loop shape of the receiving antenna may be narrowed for controlling the amount of the magnetic fluxes.

In this case, the loop shapes of the transmitting antenna and the receiving antenna are provided in the rectangular shape suitable for being arranged on the plane, and by narrowing a portion of the loop shape of the receiving antenna, the amount of magnetic fluxes at the narrowed portion of the loop of the receiving antenna can be reduced. Therefore, in the case in which the magnetic flux passing region has a wide loop shape, when a portion of the loop is narrowed, totals of the magnetic fluxes passing the magnetic flux passing region in the positive and in the inverse phases can be set to null. Even when constituted in this way, the receiving antenna can be arranged without reducing the transmitting current.

Further, in the above-mentioned antenna apparatus of the present invention, a loop shape of the transmitting antenna may be provided in a rectangular shape, a loop shape of the receiving antenna may be provided in a rectangular shape in correspondence with the loop shape of the transmitting antenna, and the portion of the loop shape of the receiving antenna may be widened for controlling the amount of the magnetic fluxes.

Similarly also in this case, by providing the loop shape of the receiving antenna in the rectangular shape suitable for being arranged on the plane and widening a portion of the loop shape of the receiving antenna, the amount of magnetic fluxes at the widened portion of the loop antenna can be increased. Therefore, when the magnetic flux passing region is constituted by a narrow loop shape, when a portion of the loop is widened, the totals of the magnetic fluxes passing the magnetic flux passing region in the positive and in the inverse phase can be set to null. Even when constituted in this way, the receiving antenna can be arranged without reducing the transmitting current.

According to the present invention, when three or more loops of the transmitting antenna is used, there can be arranged the receiving antenna in the loop shape capable of avoiding loss of current the inappropriate coupling between the transmitting antenna and the receiving antenna.

DETAILED DESCRIPTION OF THE INVENTION

An explanation will be given of an embodiment of the invention in reference to the drawings as follows.

Figure 1:
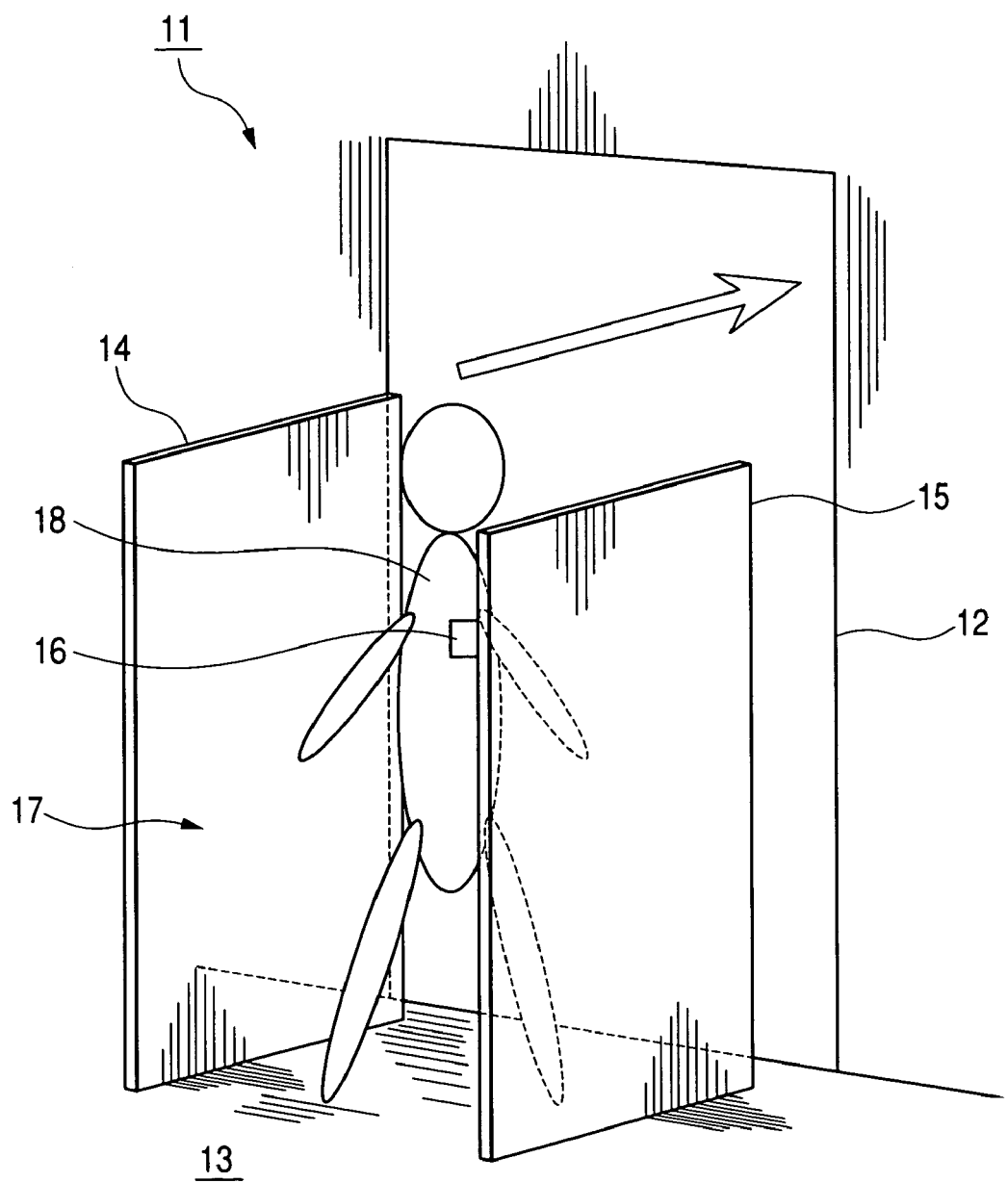
FIG. 1 is a perspective view showing a state of using an antenna apparatus for controlling entrance and evacuation.

FIG. 1 shows a mode for carrying out an antenna apparatus 11 for carrying out a control of entrance and evacuation.

The antenna apparatus 11 comprises a first antenna assembly 14 on one side and a second antenna assembly 15 on other side opposedly provided by interposing an entrance and evacuation path 13 communicating with an inlet/outlet 12.

A space formed between two sets of the same antenna assemblies 14, 15 opposed to each other is set to a detecting region 17 of an RF tag 16. Further, when a person 18 carrying the RF tag 16 moves into the detecting region 17, the antenna assemblies 14, 15 on the both sides detect presence of the RF tag 16 in noncontact by data communication.

The RF tag 16 includes an antenna coil constituted by winding a copper wire in a coil-like shape and an IC chip integrated with a memory stored with data and a necessary circuit. The RF tag 16 is integrally formed with the antenna coil and the IC chip by interposing head and tail of the RF tag 16 by protecting sheets in a rectangular shape.

The respective antenna assemblies 14, 15 are constituted by erecting vertically long flat plates each having a height corresponding to a height of an ordinary person and a length in a path direction corresponding a length enough for creating the detecting region 17 so that faces of the flat plates become communicating faces. All of the space between the communicating faces opposed to each other is set to the communicatable detecting region 17 and communication is made to be able to carry out even when the RF tag 16 passes the detecting region 17 at any position thereof.

In this case, the respective antenna assemblies 14, 15 are provided with the same antenna structure and by pairing the two sets opposedly to each other, similar communication in noncontact is carried out from the left and the right side to the detecting region 17. Therefore, an explanation will be given of the antenna structure on one side thereof.

Figure 2:
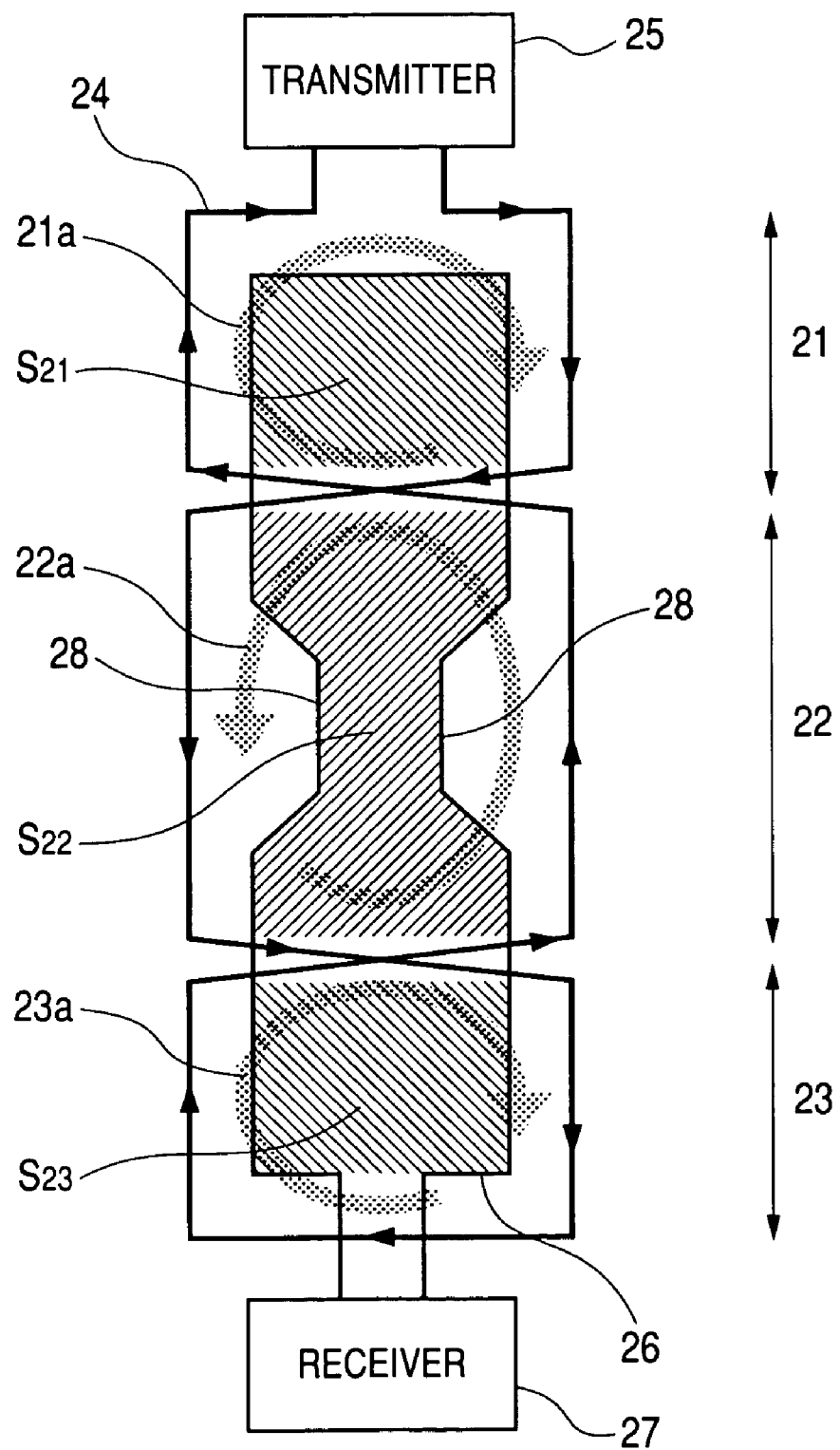
FIG. 2 is an explanatory view showing an antenna assembly having a narrow width portion.

The antenna structure of the antenna assembly, as shown by FIG. 2, a transmitter 25 is connected with a transmitting antenna 24 comprising three pieces of loop antennas of a first loop antenna 21, a second loop antenna 22, and a third loop antenna 23. The first, second and third loop antennas 21, 22 and 23 are arranged in a shape of a rectangular loop contiguously to each other on a plane in which a current flowing in other loop is made to be provided with a phase inverse to a phase of a current flowing in one loop contiguous to the other loop. A receiver 27 is connected with 1 loop of a receiving antenna 26 similarly having a rectangular shape arranged along an inner side of the transmitting antenna 24.

The above-described transmitting antenna 24 is provided with the first through the third loop antennas 21 through 23 arranged with three pieces of the rectangular loops in series. Among them, the current having the phase inverse to the phase of the current of the second loop antenna 22 flows in the first loop antenna 21 and the third loop antenna 23 arranged at both end portions. In FIG. 2, notations 21a, 23a designate the currents induced in the receiving antenna 26 by a magnetic field in a positive direction (a depth direction of paper face) and notation 22a designates the current induced in the receiving antenna 26 by a magnetic field in a reverse direction (a direction to this side of paper face).

In this case, when the receiving antenna 26 similarly having the rectangular shape is arranged on a plane the same as that of transmitting antenna 24 and on an inner side of the transmitting antenna 24, respective magnetic fluxes pass a first through a third magnetic flux passing region $S_{21}$, $S_{22}$, $S_{23}$ on an inner side of the receiving antenna 26 in correspondence with the first through the third loop antenna 21 through 23 by the magnetic field generated by the transmitting antenna 24.

At this occasion, directions of the magnetic fluxes of the first and the third magnetic flux passing regions $S_{21}$, $S_{23}$ are reverse to a direction of the magnetic fluxes of the second magnetic flux passing region $S_{22}$. When the magnetic fluxes of the respective magnetic flux passing regions $S_{21}$, $S_{22}$, $S_{23}$ are respectively designated by notations $\phi_{21}$, $\phi_{22}$, $\phi_{23}$, a total $\phi$ of magnetic fluxes passing the first through the third magnetic flux regions $S_{21}$, $S_{22}$, $S_{23}$ of the receiving antenna 26 can be represented by $\phi_{21}-\phi_{22}+\phi_{23}$.

Hence, in the embodiment of the present invention, an amount of the magnetic fluxes is controlled to reduce by forming a narrow width portion 28 such that totals of an amount of the fluxes in a positive phase and an amount of the magnetic fluxes in an inverse phase produced at the respective magnetic flux passing regions $S_{21}$, $S_{22}$, $S_{23}$ of the receiving antenna 26 are cancelled by each other. For example, the narrow width portion 28 is constituted by linear portions of the loop of the receiving antenna 26 in correspondence with, the second magnetic flux passing region $S_{22}$ of the receiving antenna 26. According to the embodiment, the narrow width portion 28 is formed by partially deforming the linear portions in a recessed trapezoidal shape.

Thereby, by reducing the magnetic flux passing region at portions narrowed by the narrow width portion 28, the amount of the magnetic fluxes at the narrowed loop portion can be reduced. Therefore, the totals of the amounts of the positive and inverse magnetic fluxes passing the respective magnetic flux passing regions of the receiving antenna 26 can finely be controlled by controlling a width of the narrow width portion 28 and the total of the magnetic flux amounts can easily be set to null. Therefore, even when the receiving antenna 26 is assembled with the transmitting antenna 24, the receiving antenna 26 can be arranged without effecting an adverse influence on a transmitting current. Therefore, the receiving antenna 26 can be provided without deteriorating the transmitting current.

The transmitter 25 and the receiver 27 are connected to a control portion, not illustrated, for detecting the RF tag 16. Thereby, a control for communicating with the RF tag 16 is executed in accordance with a control instruction from the control portion.

Although according to the above-described embodiment, the amounts of the magnetic fluxes having different phases are controlled to cancel by each other completely by narrowing the loop of the receiving antenna 26. Contrary thereto, the amounts of the magnetic fluxes having different phases can also be controlled to cancel by each other completely by widening the loop.

Figure 3:
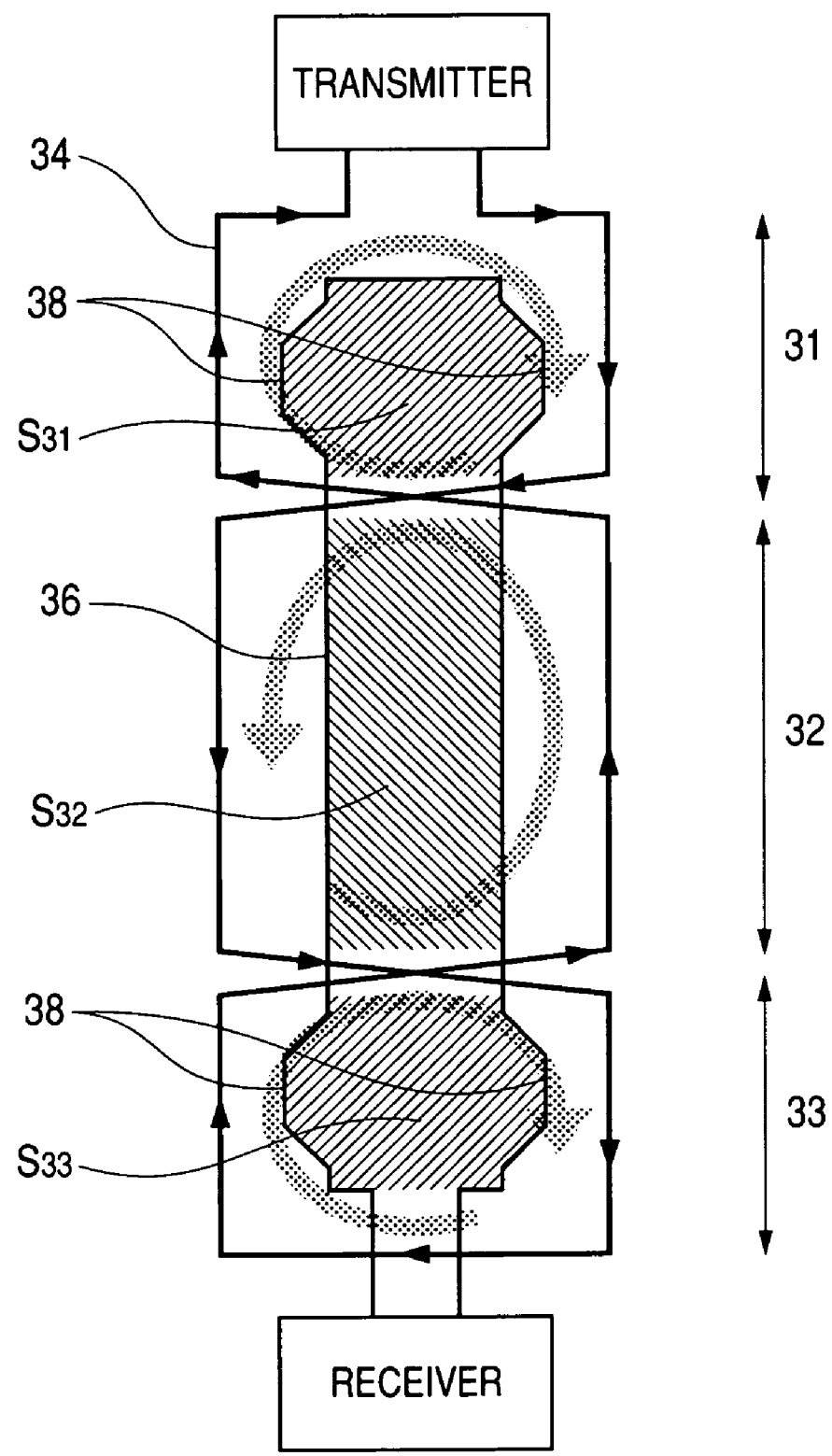
FIG. 3 is an explanatory view showing an antenna assembly having a wide width portion.

For example, as shown by FIG. 3, a transmitting antenna 34 is constructed by a constitution the same as that of the above-described embodiment and includes a first through a third loop antenna 31 through 33 arranged with three pieces of the rectangular loops in series. Among them, currents having inverse phases are made to flow to the first and the third loop antennas 31, 33 arranged at both end portions of the transmitting antenna 34 and the second loop antenna 32 at a middle portion of the transmitting antenna 34.

In this case amounts of magnetic fluxes are controlled to increase by forming wide width portions 38 such that totals of an amount of magnetic fluxes in a positive phase and an amount of magnetic fluxes in an inverse phase produced at the respective magnetic flux passing regions $S_{31}$, $S_{32}$, $S_{33}$ are cancelled by each other when the receiving antenna 36 similarly in a rectangular shape is arranged on a plane the same as that of the transmitting antenna 34 along an inner side of the transmitting antenna 34. For example, the wide width portions 38 are constituted by widening linear portions of loops of the receiving antenna 36 in correspondence with a first magnetic flux passing region $S_3$, and a third magnetic flux passing region $S_{33}$ of the receiving antenna 36. According to the embodiment, the wide width portion 38 is formed by being projected in a projected trapezoidal shape.

When constituted in this way, an amount of magnetic fluxes can be increased by increasing a magnetic flux passing region at a widened portion of the receiving antenna 36 by the wide width portion 38. Therefore, when there is constituted a loop shape in which any of the magnetic flux passing regions $S_{31}$, $S_{32}$, $S_{33}$ of the receiving antenna 36 is narrowed and the amount of magnetic fluxes is more or less small, by widening the corresponding loop portion which is requested for an increase in the amount of magnetic fluxes, totals of the positive and inverse magnetic flux amounts produced at the receiving antenna can be set to null. Also in this case, since there is not produced a difference between positive and the inverse magnetic flux amounts and therefore, loss of the current can be avoided by preventing the reduction in the current by the inappropriate coupling between the transmitting antenna 34 and the receiving antenna 36.

In this way, when the totals of the amounts of the magnetic fluxes in the positive phase and in the inverse phase are slightly different from each other, the totals of the amounts of the magnetic fluxes having the different positive and inverse phases can be set to null by narrowing or widening the loop shape on one side for finely controlling the amounts of the magnetic fluxes. Otherwise, amounts of the magnetic fluxes can also be controlled by narrowing the width of the magnetic flux passing region on one side of one loop of the receiving antenna and widening the width of the magnetic flux passing region on other side of the loop.

Although the above-described shapes of the narrow width portion 28 and the wide width portion 38 may be set to arbitrary recessed and projected shapes, it is preferable to produce the magnetic fluxes having an excellent balance by constituting symmetrical shapes in an up and down direction and in a left and right direction.

Figure 4:
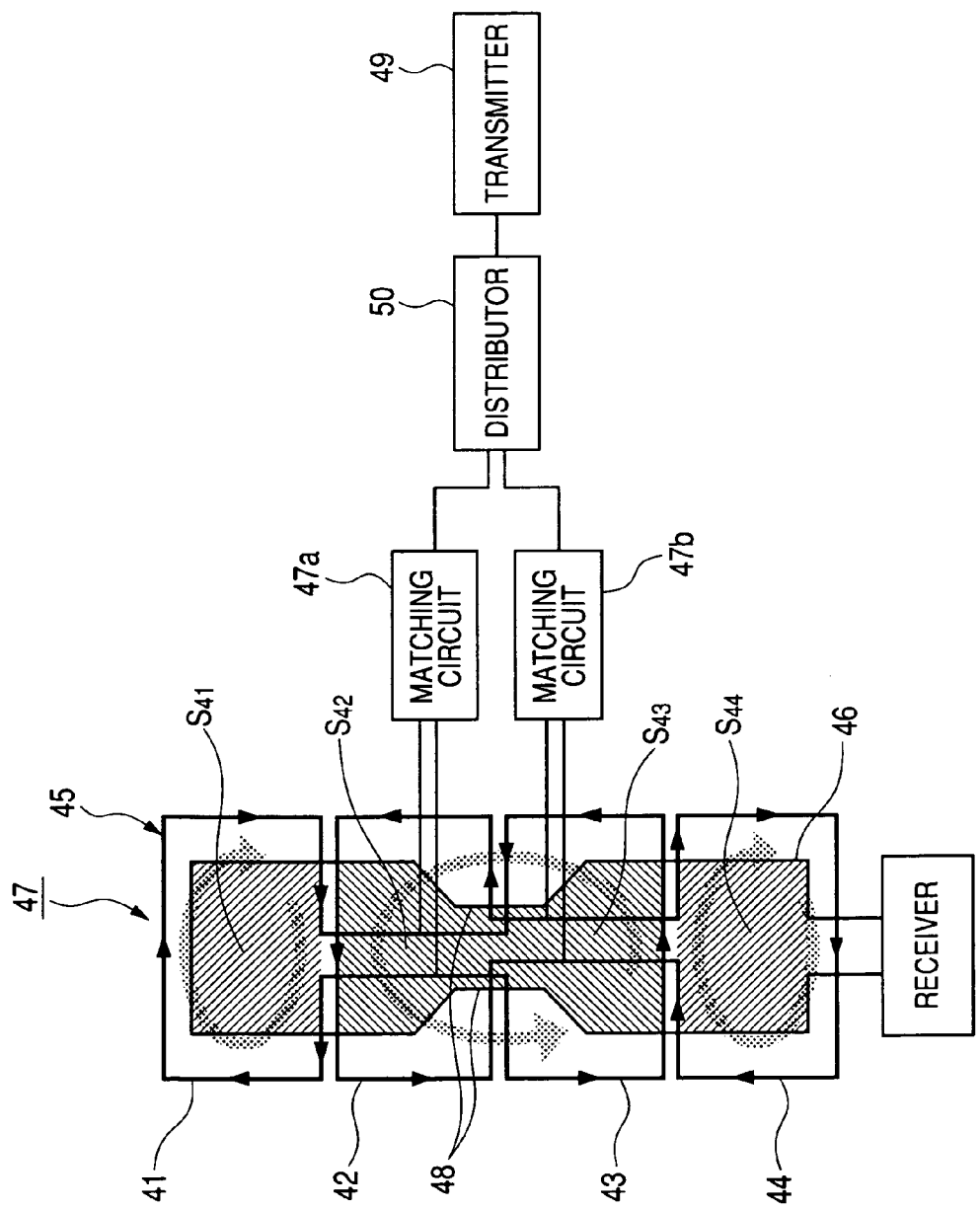
FIG. 4 shows an antenna assembly having a 4 loop antenna and a circuit constitution diagram thereof.

FIG. 4 shows an antenna assembly 47 constructed by combining a transmitting antenna 45 including a first through a fourth loop antenna 41 through 44 and a large 1 loop of a receiving antenna 46 along inner sides of the transmitting antenna 45.

According to the antenna assembly 47, the first, the third loop antennas 41, 43 in which both end portions of a coil are bent in a rectangular loop shape so as to constitute rectangular shapes and which are connected to a matching circuit 47a by being extended outwardly in parallel with each other from substantially middle points of sides of a middle narrow width portion of the coil are arranged on the same plane and on sides reverse to each other by interposing terminals connected to the matching circuit 47a.

Similarly, the second and the fourth loop antennas 42, 44 in which both end portions of a coil are bent in a rectangular loop shape so as to constitute rectangular shapes and which are connected to a matching circuit 47b by being extended outwardly in parallel with each other from substantially middle points of sides of a middle narrow width portion of the coil are arranged on the same plane and on sides reverse to each other by interposing terminals connected to the matching circuit 47b.

Further, there is constructed a constitution in which the first, the second, the third, the fourth loop antennas 41 through 44 are arranged in this order such that sides of the rectangular shapes are contiguous to each other on the same plane.

Further, a control is carried out such that currents flowing in the first, the third loop antennas 41, 43 and the second and the fourth loop antennas 42, 44 constitute phases inverse to each other and the phase of the current flowing at either of the first, the third loop antennas 41, 43 or the second, the fourth loop antennas 42, 44 is inverted by a predetermined timing in correspondence with data communication.

Thereby, a detecting function is maintained by switching detecting regions and complementing detecting regions of a central portion of the antenna and both sides of the antenna over time.

In the switching, after a transmitting signal output from a transmitter 49 is inputted into a distributor 50, the transmitting signal inputted to the distributor 50 is distributed to outputs to the matching circuit 47a on one side and the matching circuit 47a on other side to thereby switch the phase.

Also in this case, when the receiving antenna 46 is arranged on a plane the same as that of the transmitting antenna 44 along an inner side of the transmitting antenna 45, the totals of the amount of magnetic fluxes in a positive phase and the amount of magnetic fluxes in an inverse phase produced at respective flux passing regions $S_{41}$, $S_{42}$, $S_{43}$, $S_{44}$ in correspondence with the first through the fourth loop antennas 41 through 44 of the transmitting antenna 44 are canceled by each other.

For example, loops forming linear portions on both sides of the second magnetic flux passing region $S_{42}$ and the third magnetic flux passing region $S_{43}$ of the receiving antenna 46 are respectively formed into a narrow width portion 48 constituted by being narrowed in a trapezoidal shape inward therefrom to thereby control amounts of magnetic fluxes.

A method of controlling a specific shape of a receiving antenna and actual measured values are shown below.

Figure 11:
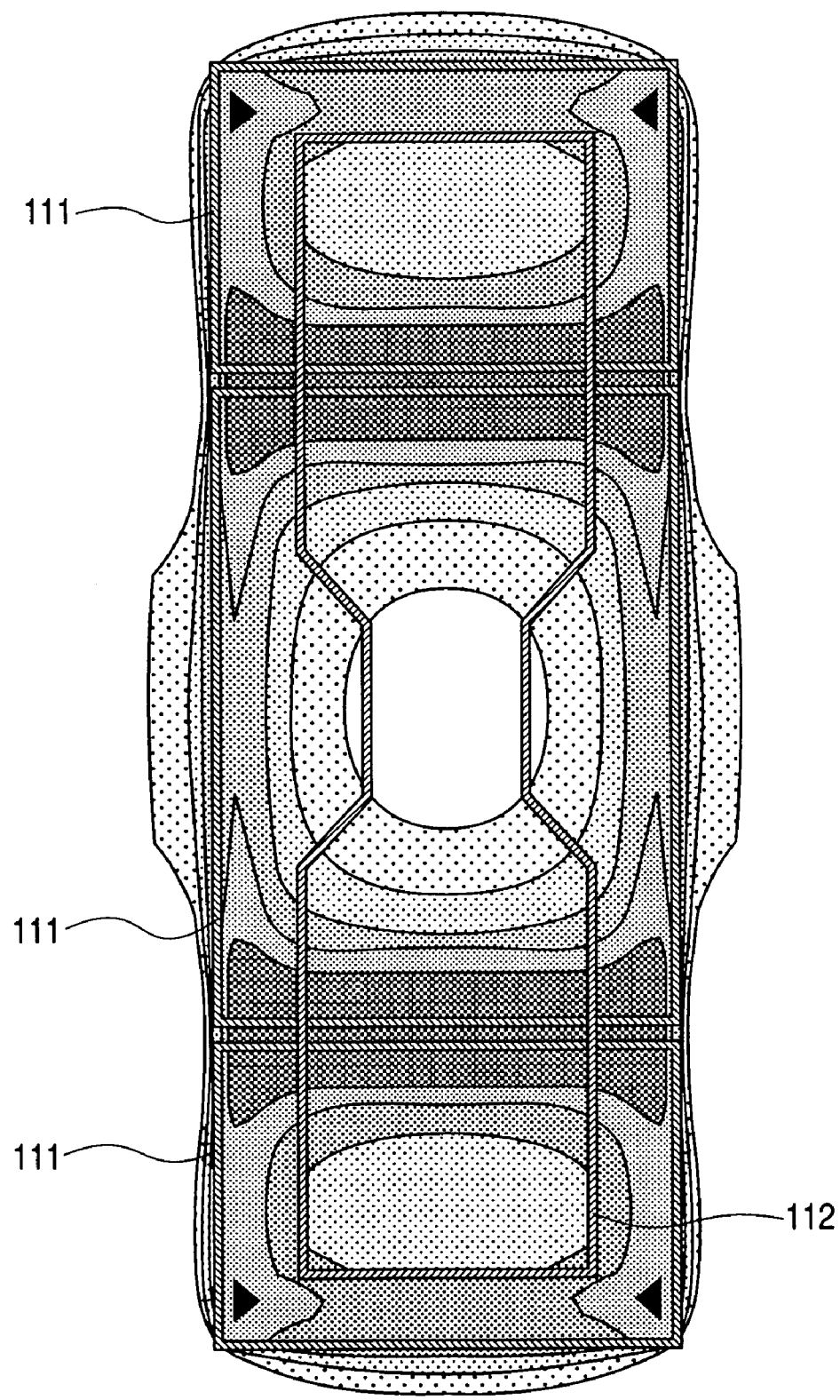
FIG. 11 is an explanatory view showing a magnetic flux density distribution of 3 loops of an antenna assembly.

First, FIG. 11 shows a distribution of a magnetic flux density in a plane arranged with a transmitting antenna 111 and a receiving antenna 112 in a direction orthogonal to a paper face when a current is made to flow to 3 loops of the transmitting antenna 111 by a variable density of color.

In this way, the magnetic flux density formed by the transmitting antenna is complicatedly distributed and it is not easy to control such that totals of amounts of magnetic fluxes passing the receiving antenna arranged along the transmitting antenna are cancelled by each other.

Theoretically, when a magnetic flux distribution per unit area is uniform, a magnetic flux amount becomes a product of the magnetic flux density by the area, however, actually, as shown by FIG. 11, the magnetic flux density is not uniform and therefore, the magnetic flux amount is calculated not by the simple product but by integrating calculation.

Further, the magnetic flux amount calculated by the calculation is delicately different from an actually measured value and therefore, a final shape of the receiving antenna is determined by fine adjustment by forming an outline shape by the above-described integrating calculation and thereafter detecting a value of a current flowing in the receiving antenna when the current is made to flow actually to the transmitting antenna.

Figure 10:
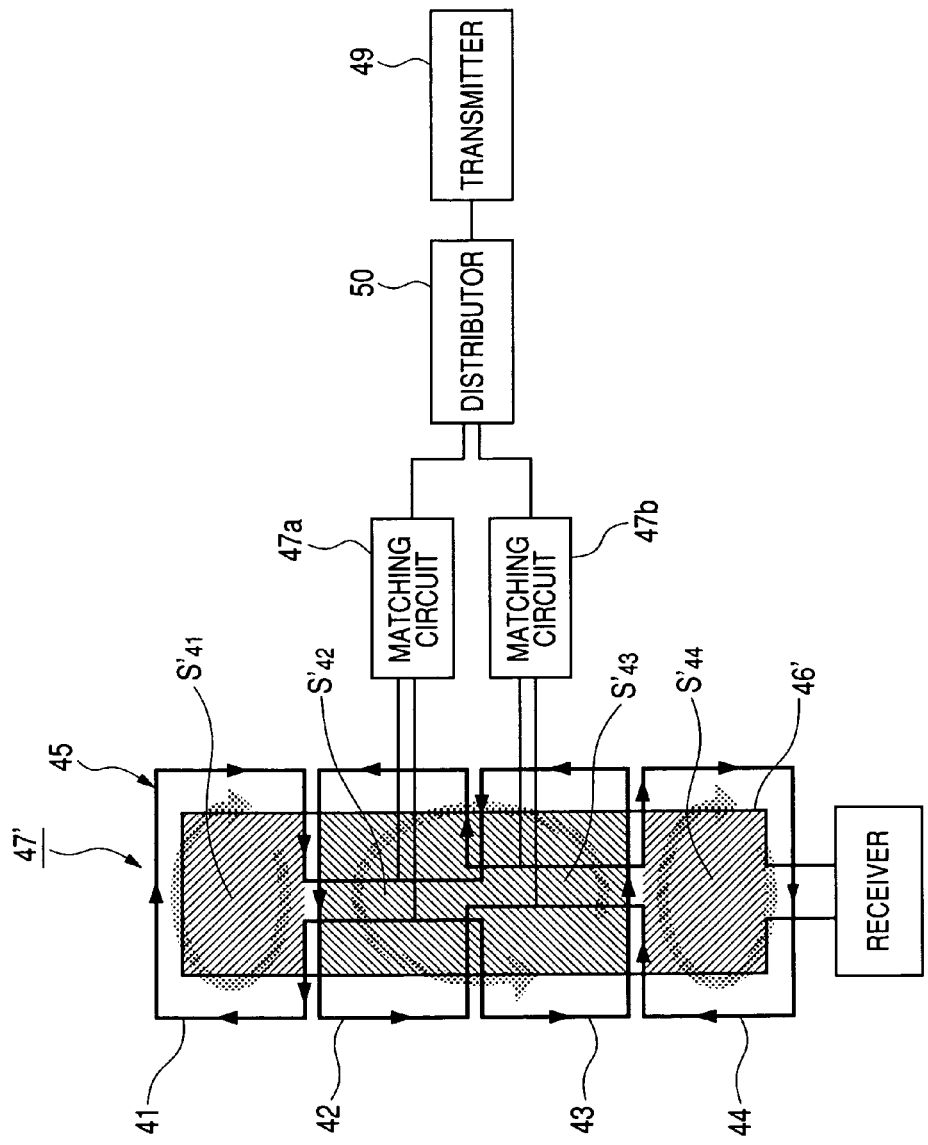
FIG. 10 is an explanatory view showing 4 loops of an antenna assembly of a related art.

Here, there is shown a measured result in which the effect of the invention is achieved and the current flowing in the transmitting antenna is not reduced by taking an example of a case of 4 loops of the antenna assembly of FIG. 4 and comparing the example with 4 loops of an antenna assembly of a related art in FIG. 10.

Table 1 shown below shows values of currents flowing in respective antennas in the above-described both cases.

TABLE 1

|  | Embodiment of the invention of FIG. 4 | Related art of FIG. 10 |
|---|---|---|
| Transmitting antenna 41 | 610 | 610 |
| Transmitting antenna 42 | 670 | 550 |
| Transmitting antenna 43 | 620 | 550 |
| Transmitting antenna 44 | 570 | 520 |
| Receiving antenna 46 (46') | 8 | 240 |

(Unit: mA)

Here, although the transmitting antennas 41 through 44, a circuit constitution and a control method of an antenna assembly 47' of FIG. 10 are the same as those of FIG. 4, a receiving antenna 46' is formed in a simple rectangular shape as described above as the related art and a modification is not carried out at all with regard to control of the magnetic flux amount.

As shown by Table 1, it is clearly apparent that in the embodiment of FIG. 4 of the invention, in comparison with the related art of FIG. 10, a current flowing in the receiving antenna 46 (46') is reduced to be infinitely proximate to null and in accordance therewith, currents which are to flow to the transmitting antennas 41 through 44 are not reduced.

As a result, the currents flowing in the transmitting antennas 41 through 44 are not reduced by being coupled with the receiving antenna and a communicable range of the transmitting antenna can be maintained widely.

In contrast thereto, in the case of the related art of FIG. 10, it is apparent that the currents of the transmitting antennas 41 through 44 are reduced by an inappropriate coupling of the transmitting antenna and the receiving antenna, as a result, the communicatable range is reduced.

That is, in FIG. 10, totals of an amount of magnetic fluxes in a positive phase and an amounts of magnetic fluxes in an inverse phase produced at respective magnetic flux passing regions $S'_{41}$, $S'_{42}$, $S'_{43}$, $S'_{44}$ are not canceled by each other.

For example, when a current is made to flow in the transmitting antenna 45 in a direction as shown in FIG. 10, the amount of magnetic fluxes in a direction to this side of paper face produced at $S'_{42}$, $S'_{43}$, is not equilibrated with the amount of magnetic fluxes in a depth direction of paper face produced at $S'_{41}$, $S'_{44}$ and therefore the current is induced at the receiving antenna 46'.

Hence, as shown by FIG. 4, there is achieved an equilibrium between the amount of magnetic fluxes produced at $S_{41}$, $S_{44}$ and the amount of magnetic fluxes produced at $S_{42}$, $S_{43}$, by narrowing the regions of $S_{42}$, $S_{43}$ by the narrow width portion 48.

Further, the control is carried out also of the case of converting the phase of the current by the matching circuit 47.

In the case of the example of FIG. 4, a detecting region which cannot be detected by the above-described direction of the magnetic field can be complemented over time by making directions of magnetic fields produced at $S_{41}$, $S_{42}$ the same as each other and making directions of magnetic fields produced at $S_{43}$, $S_{44}$ the same as each other.

Therefore, there is achieved an equilibrium between a sum of the magnetic flux amount produced at $S_{41}$ and $S_{42}$ and a sum of the magnetic flux amount produced at $S_{43}$ and $S_{44}$, as a result, the shape of the narrow width portion 48 is finely controlled such that the current is not induced in the receiving antenna 46.

Since it is necessary to make the above-described fine control and the control of $S_{42}$, $S_{43}$ relative to $S_{41}$, $S_{44}$, mentioned above, compatible with each other, when the detected regions are switched, it is preferable that the narrow width portion 48 is formed in a plurality of the magnetic flux passing regions or formed over the plurality of magnetic flux passing regions.

In the both cases, an optimum case in which the current flowing in the receiving antenna 46 is the mostly reduced is found by controlling the shape of the narrow width portion 48.

In the case of using further a phase pattern of the current flowing in the transmitting antenna, in respective cases, the optimum case in which the current flowing in the receiving antenna 46 is mostly reduced is found by controlling the shape of the narrow width portion 48.

Figure 5:
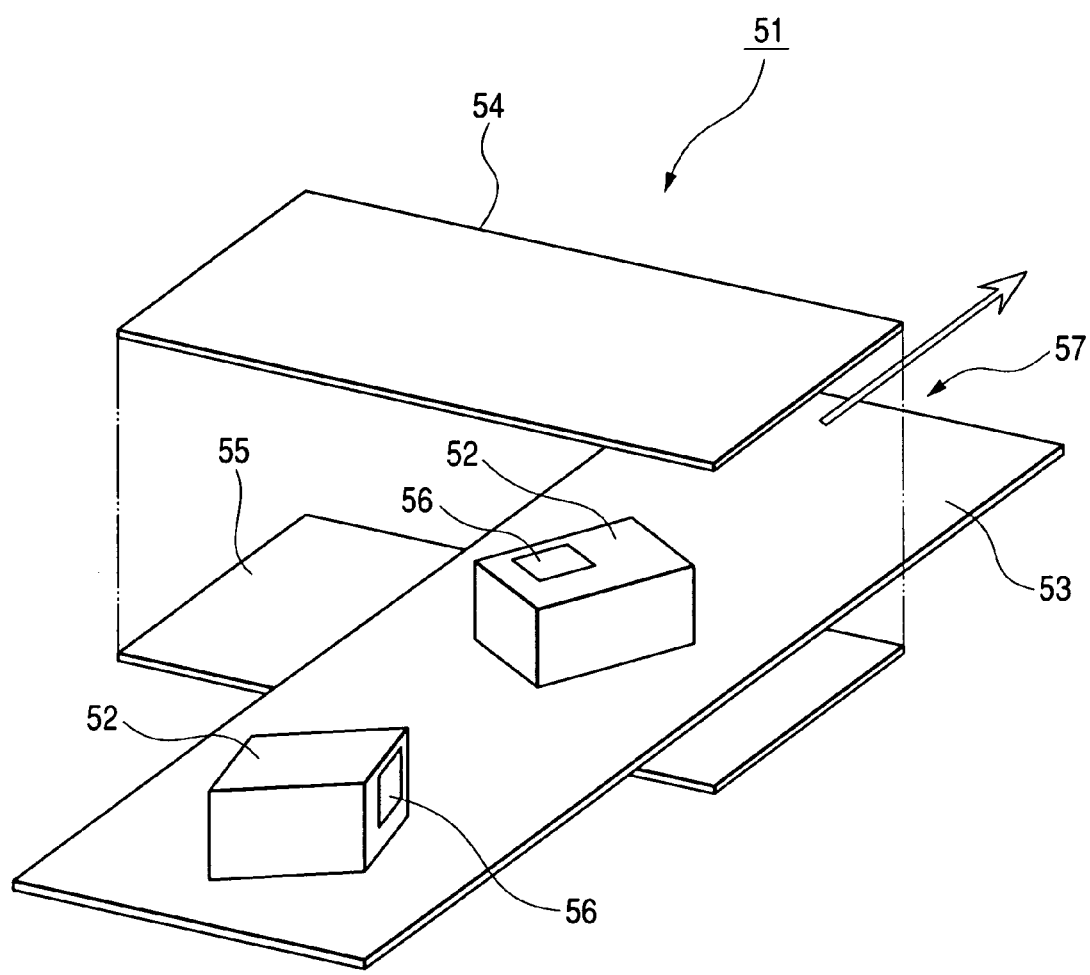
FIG. 5 is a perspective view showing a state of using an antenna apparatus applied to automatic sorting of goods.
Figure 6:
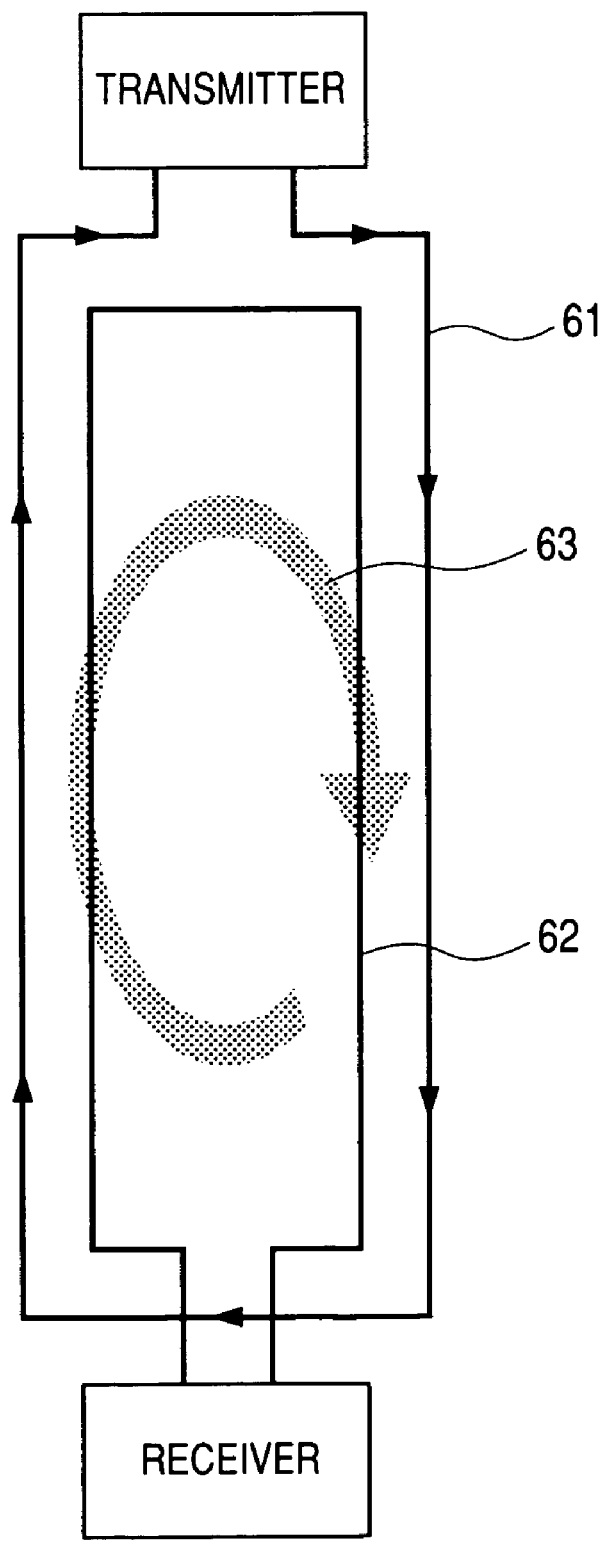
FIG. 6 is an explanatory view showing 1 loop of an antenna assembly of a related art.
Figure 7:
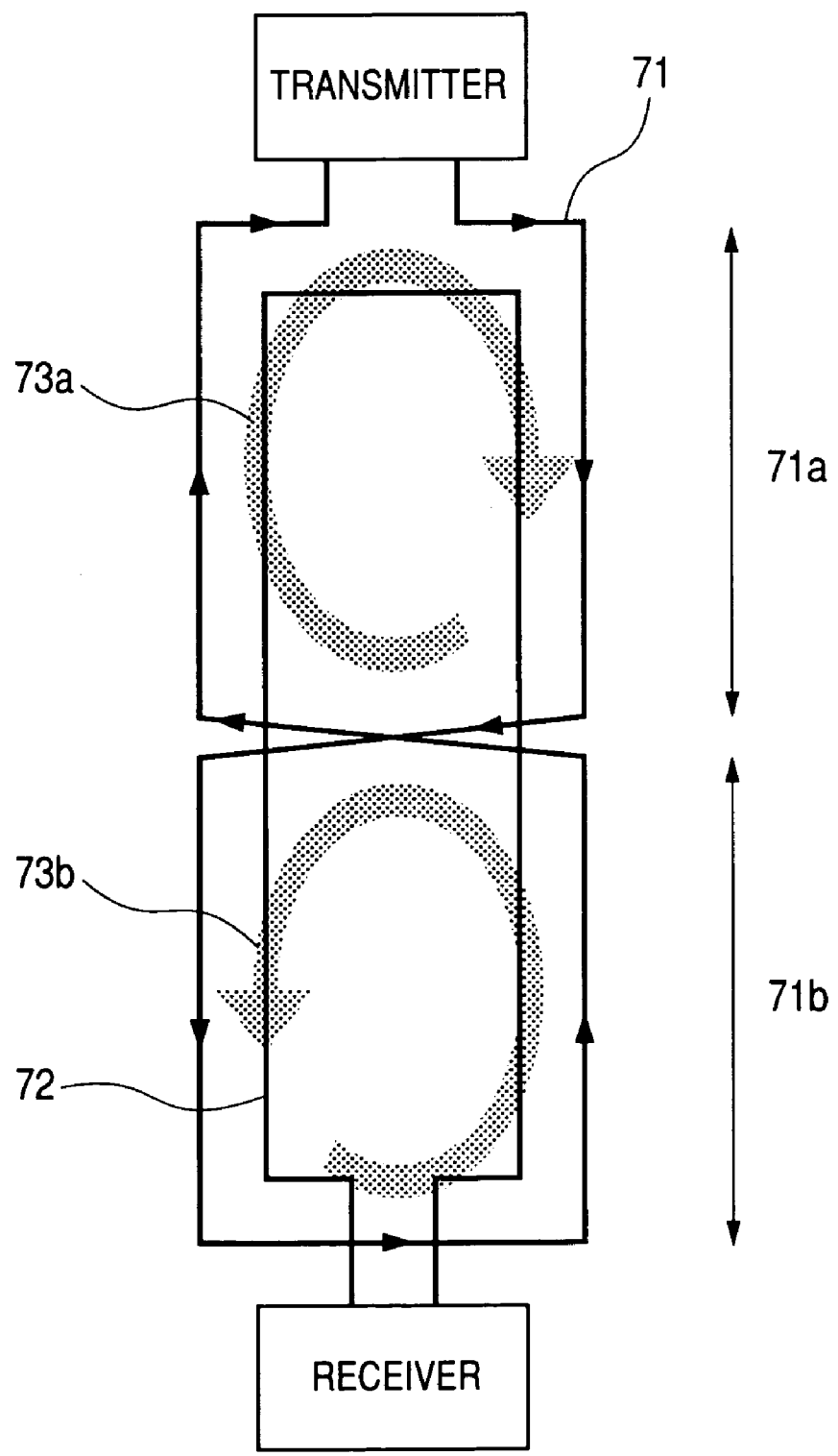
FIG. 7 is an explanatory view showing 2 loops of an antenna assembly of a related art.
Figure 8:
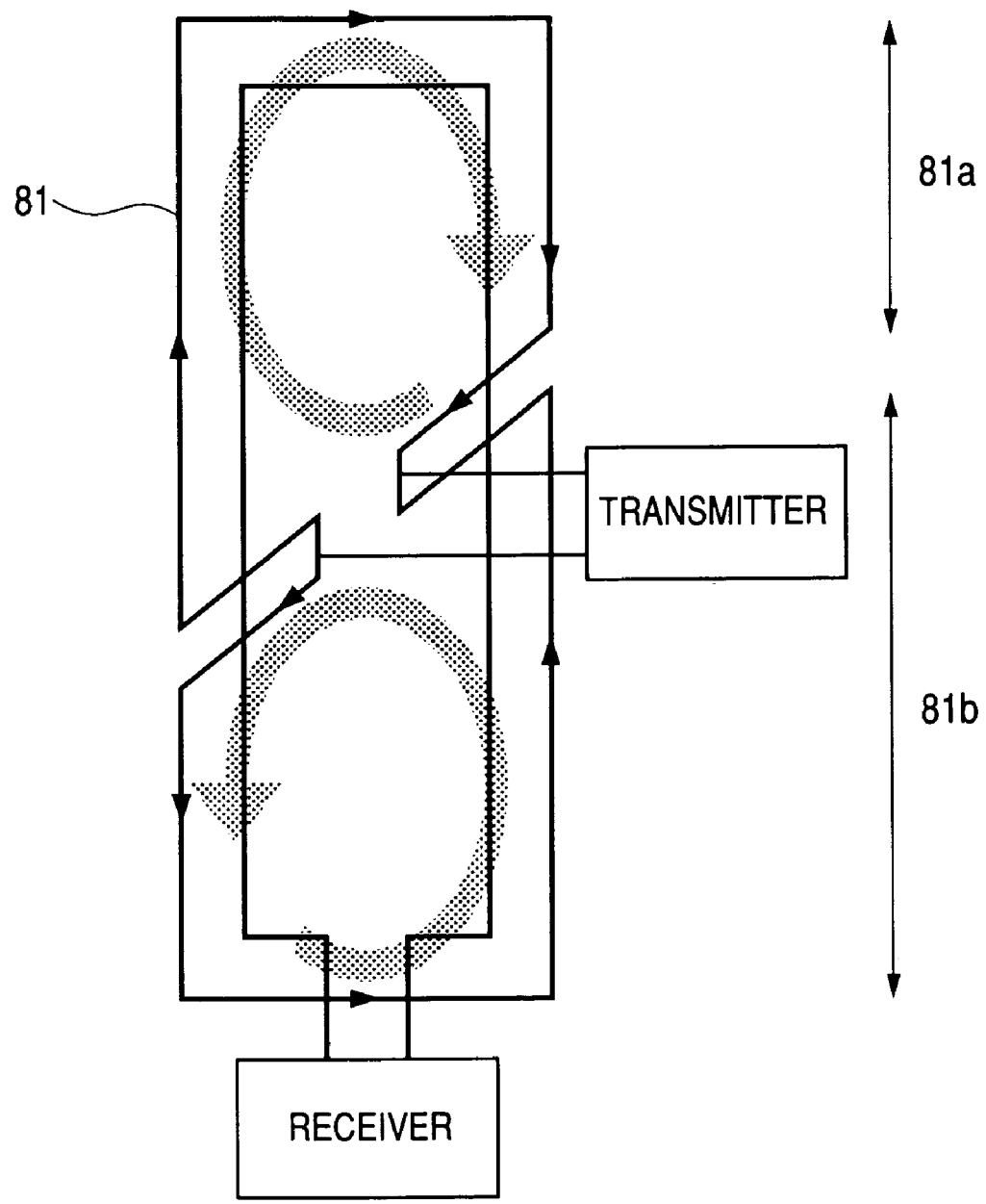
FIG. 8 is an explanatory view showing 2 loops of a different antenna assembly of a related art.
Figure 9:
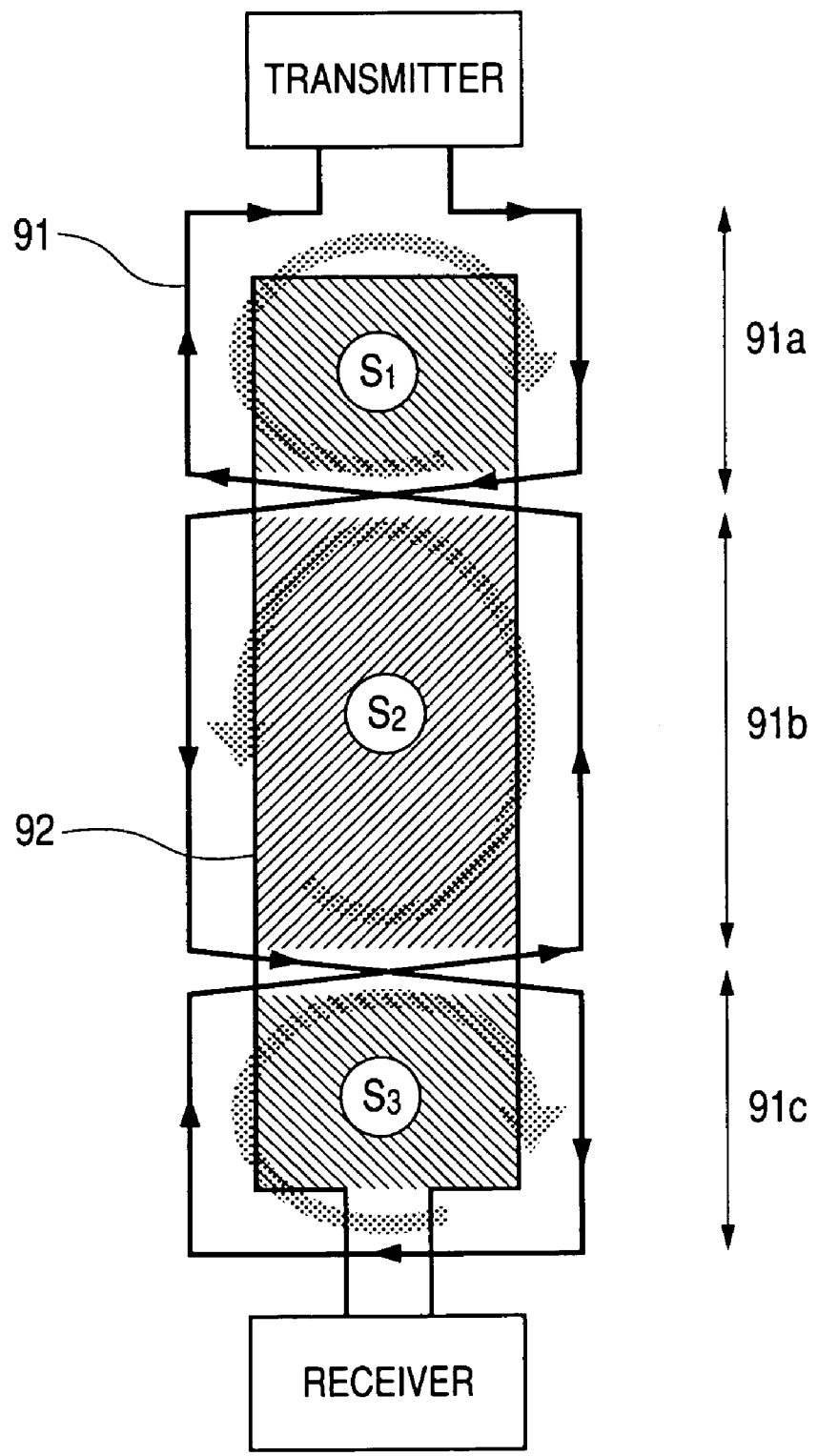
FIG. 9 is an explanatory view showing 3 loops of an antenna assembly of a related art.

FIG. 5 shows the case of applying an antenna apparatus 51 to automatic sorting of goods.

The antenna apparatus 51 is constituted by opposedly providing a first antenna assembly 54 and a second antenna assembly 55 at detecting positions separated from each other in an up and down direction interposing an upper and a lower face of a belt conveyer 53 mounting and carrying goods 52.

In this case, RF tags 56 attached to the goods 52 are carried by the belt conveyer 53 along with the goods 52 and when the RF tag 56 reaches a detecting region 57 opposed to the first and the second antenna assemblies 54, 55, the antenna assemblies 54, 55 opposed to each other in the up and down direction communicate in noncontact with the RF tag 56 to detect presence of the RF tag 56 and carry out data communication with the RF tag 56.

When the data communication is carried out, at the detecting region 57, data of the RF tags 56 attached to the goods 52 are read and based on the read data, the respective goods 52 can automatically be sorted in directions of desired processings by controlling to carry the goods 52 in directions in accordance with the read data.

In this way, the invention is applicable not only in detecting individual goods but also applicable to all of a path of a gate or the like for controlling entrance and evacuation to specify respective persons by detecting the RF tags carried by the persons or a carrying path of a belt conveyer or the like.

In correspondence between the constitution of the invention and the above-described constitution of the embodiment, a data carrier of the invention corresponds to the RF tags 16, 56 of the embodiment, similarly as follows, a modification of the loop shape corresponds to the narrow width portions 28, 48 and the wide width portion 38, however, the invention is not limited only to the above-described embodiment but applicable based on the technical thought shown in Claims and a number of embodiments can be provided.

What is claimed is:

1. An antenna apparatus comprising:
    at least one antenna assembly having a transmitting antenna and a receiving antenna arranged to be along the transmitting antenna on the same plane, the transmitting antenna having three or more loops arranged in a loop shape contiguously to each other on a plane so that at least one loop is formed in a manner that a phase of a current flowing in the loop is made to be inverse to a phase of a current flowing in other loop contiguous to the loop, the receiving antenna having one loop, wherein a data communication is carried out in noncontact between the antenna assembly and a data carrier,
    wherein:
        a portion of a loop shape of the loop of the receiving antenna corresponding to at least one magnetic flux region of the receiving antenna has a narrowed portion and other widened portions for controlling magnetic flux and to provide such that totals of an amount of magnetic fluxes in a positive phase and an amount of magnetic fluxes in an inverse phase produced at respective magnetic flux passing regions of the receiving antenna in correspondence with the respective loops of the transmitting antenna are cancelled by each other.

2. The antenna apparatus according to claim 1, wherein a loop shape of the transmitting antenna is provided in a rectangular shape, and a loop shape of the receiving antenna is provided in a rectangular shape in correspondence with the loop shape of the transmitting antenna.

3. A system for detecting an object in a detection area, the system comprising:
    a data carrier attached to the object;
    an antenna apparatus for detecting the object in the detection area by carrying out a data communication in noncontact between the antenna assembly and the data carrier attached to the object,
    the antenna apparatus including,
    at least one antenna assembly having a transmitting antenna and a receiving antenna arranged to be along the transmitting antenna on the same plane, the transmitting antenna having three or more loops arranged in a loop shape contiguously to each other on a plane so that at least one loop is formed in a manner that a phase of a current flowing in the loop is made to be inverse to a phase of a current flowing in other loop contiguous to the loop, the receiving antenna having only one loop,
    wherein a portion of a loop shape of the loop of the receiving antenna corresponding to at least one magnetic flux region of the receiving antenna is modified to provide such that totals of an amount of magnetic fluxes in a positive phase and an amount of magnetic fluxes in an inverse phase produced at respective magnetic flux passing regions of the receiving antenna in correspondence with the respective loops of the transmitting antenna are cancelled by each other.

* * * * *